Jan. 9, 1945.    C. J. JOHNSON    2,366,909
POWER ACTUATED PRUNING SHEARS
Filed June 29, 1943
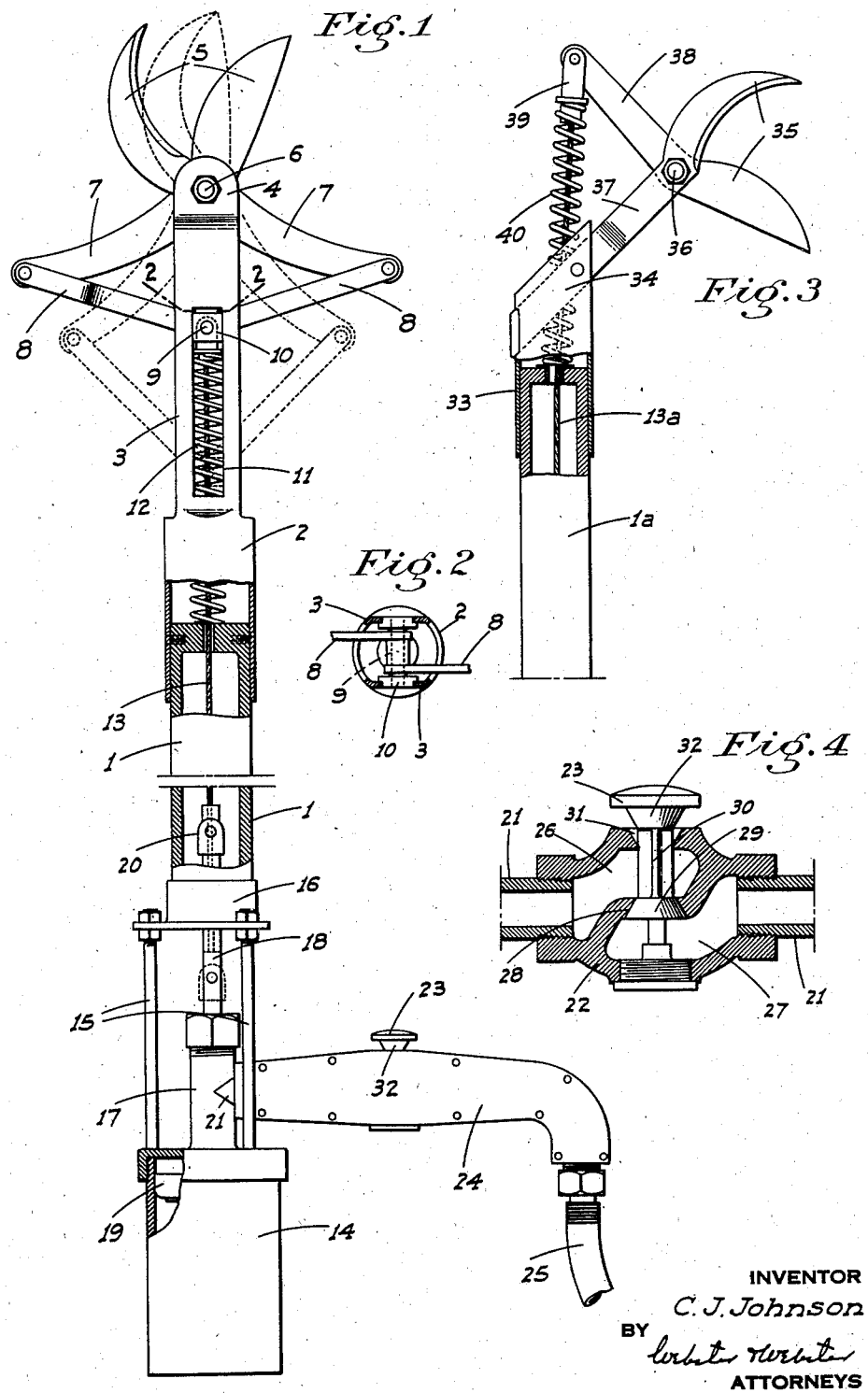
INVENTOR
C. J. Johnson
BY
ATTORNEYS Patented Jan. 9, 1945

2,366,909

UNITED STATES PATENT OFFICE 2,366,909

POWER ACTUATED PRUNING SHEARS

Charles J. Johnson, Sacramento, Calif.

Application June 29, 1943, Serial No. 492,714

1 Claim. (Cl. 30—228)

This invention relates in general to improvements in pruning shears, and in particular the invention is directed to, and it is an object to provide, power actuated pruning shears of novel construction.

Another object of the invention is to provide a pole type of pruning shears which comprises in combination with a pole, a shear assembly mounted on the upper end of the pole, a fluid pressure actuated power cylinder mounted on the lower end of the pole, and an actuating element connecting said shear assembly and cylinder; the pole being tubular and the actuating element extending therethrough.

A further object of the invention is to provide pruning shears, as above, in which said connecting and actuating element is relatively flexible and may be comprised of a limber rod, or wire cable as shown; there being a normally loaded spring which tends to hold the blades of the shears assembly open.

A still further object is to employ a novel handle and valve arrangement in connection with the device adjacent the power cylinder.

It is also an object to provide a pole type, power-actuated pruning shears which includes a novel form of shear assembly.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a foreshortened elevation, partly in section, of the device.

Figure 2 is a cross section on line 2—2 of Fig. 1.

Figure 3 is a fragmentary elevation, partly in section, illustrating a modified form of shear assembly.

Figure 4 is an enlarged longitudinal sectional elevation of the valve employed.

Referring now more particularly to the characters of reference on the drawing, and at present to Figs. 1, 2, and 4, the numeral 1 indicates a relatively long pole which is tubular, as shown, and which may be sectional.

At its upper end the pole 1 is fitted with a shear assembly which comprises the following:

A collar 2 surrounds and is secured to said end of the pole, and includes a pair of opposed, longitudinally and outwardly projecting legs 3 which are brought into engaging relation at their outer ends 4 with the pivotal portions of intersecting blades 5. A pivot bolt 6 extends through leg portions 4 and the blades 5, forming the axis of and supporting the latter. The blades 5 are normally open and include shanks 7 which extend downwardly in outwardly diverging relation from bolt 6.

Opposed links 8 pivotally connect between the outer ends of shanks 7 and the cross pin 9 of a slide unit 10 disposed between legs 3 and which rides in guided relation in parallel, longitudinally extending slots 11 in said legs.

A loaded compression spring 12 is engaged between the bottom of slide unit 10 and the upper and partially closed end of pole 1; said spring normally holding the slide unit at the upper ends of slots 11, whereby blades 5 are open.

A flexible pull element, such as a small wire cable 13, is connected with the slide unit 10 at the bottom and thence extends downwardly through spring 12 and pole 1 to adjacent the lower end of the latter where connection is made with the following described power cylinder assembly.

A relatively small power cylinder 14 is disposed in axial alined but spaced relation to the lower end of the pole and is connected thereto by circumferentially disposed tie bolts 15 and a flanged attachment collar 16 on said lower end of the pole.

The cylinder includes a neck 17 which projects toward the pole and serves as the guide for a projecting piston rod 18 which is connected at its inner end to a normally retracted piston 19 in cylinder 14. The free or other end of the piston rod 18 is attached to the adjacent end of cable 13 by a clevis unit 20.

Air or other fluid under pressure is fed, when desired, to cylinder 14 above the piston 19, by means of a conduit 21 connected to and projecting laterally from neck 17; such conduit having a valve 22 interposed therein, such valve including a control button 23. The conduit 21 and valve 22, except for button 23, are preferably enclosed by a handle 24, which may be of two-piece plastic construction. A flexible supply base 2 connects between the outer end of conduit 21 and a fluid pressure source (not shown).

The valve 22 includes separate chambers 26 and 27 between which a tapered valve seat opening 28 communicates. A valve 29 carried on the stem 30 of push button 23 is disposed in chamber 27 and normally closes against seat 28 in the direction of chamber 26, due to the influence of fluid under pressure in chamber 27, which is the pressure side of the valve. The stem 30 is fluted or longitudinally grooved as shown and passes through another tapered valve seat 31, which opens through the valve housing under push button 23, and is opposed to valve seat 28. The under side of push button 23 is formed as a valve 32 normally open relative to but adapted to engage with seat 31.

The parts of the pruning shears are normally in the position shown in full lines in Fig. 1, and upon manual depression of push button 23, valve 29 opens and valve 32 is closed, whereupon fluid pressure passes to cylinder 14, advancing piston 19. With advance of the piston, cable 13 pulls slide unit 10 downwardly and links 8 actuate the blades 5 in a direction to close the same.

The push button is then released and the valves return to normal position, the spring 12 opening the blades and retracting the piston; air pressure in the cylinder and conduit 21 ahead of the valve being relieved through valve seat opening 31 when valve 32 opens.

In Fig. 3 I illustrate a modified form of shear assembly which is constructed as follows:

A collar 33 surrounds and is secured to the upper end of the pole 1a, and includes a longitudinally extending leg 34. A shear unit including intersecting blades 35 which face laterally, is pivoted together at 36 and disposed mainly in radially offset relation to the axis of the pole. The blade shanks 37 and 38 diverge as shown with the shank 37 being in engagement with and fixedly secured to the leg 34.

The cable 13a is connected at its upper end by a clevis 39 with the free end of shank 38, and a loaded compression spring 40 surrounds the cable and engages between said clevis 39 and the adjacent end of pole 1a.

This form of shear assembly is normally open and is actuated to closed position in the same manner as the embodiment shown in Fig. 1.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

Power actuated pruning shears comprising a tubular pole, a shear assembly mounted on the upper end of the pole, a fluid pressure actuated power cylinder disposed in spaced, adjacent but axial alinement with the lower end of the pole, means including tie bolts connecting the cylinder to the pole, a piston rod projecting from the cylinder toward the pole, a pull element passing through the pole and connecting said assembly and rod, a neck formed with the cylinder surrounding and guiding said rod, and a handle projecting laterally from said neck; there being a fluid pressure supply conduit extending through the handle and communicating with the cylinder through the neck, and a control valve in the conduit operable from the handle.

CHARLES J. JOHNSON.